United States Patent
Xu et al.

(10) Patent No.: US 11,477,109 B2
(45) Date of Patent: Oct. 18, 2022

(54) METHOD FOR SYNCHRONIZING TOPOLOGY INFORMATION IN SFC NETWORK, AND ROUTING NETWORK ELEMENT

(71) Applicant: Huawei Technologies Co., Ltd., Shenzhen (CN)

(72) Inventors: Ling Xu, Beijing (CN); Jie Dong, Beijing (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 16/285,817

(22) Filed: Feb. 26, 2019

(65) Prior Publication Data

US 2019/0190813 A1  Jun. 20, 2019

Related U.S. Application Data

(63) Continuation of application No. PCT/CN2017/098294, filed on Aug. 21, 2017.

(30) Foreign Application Priority Data

Aug. 26, 2016 (CN) .......................... 201610741800.8

(51) Int. Cl.
*H04L 45/02* (2022.01)
*H04L 45/64* (2022.01)
*H04L 45/60* (2022.01)

(52) U.S. Cl.
CPC .............. *H04L 45/02* (2013.01); *H04L 45/60* (2013.01); *H04L 45/64* (2013.01)

(58) Field of Classification Search
CPC ......... H04L 45/02; H04L 45/64; H04L 45/60; H04L 45/54; H04L 41/12; H04L 45/745; H04W 40/02; H04W 40/04
See application file for complete search history.

(56) References Cited

U.S. PATENT DOCUMENTS 9,143,557 B2  9/2015  Guichard et al.
10,361,954 B2  7/2019  Xu et al.
(Continued)

FOREIGN PATENT DOCUMENTS

CN  1780250 A    5/2006
CN  101997752 A  3/2011
(Continued)

OTHER PUBLICATIONS

Farrel, A., et al, "BGP Control Plane for NSH SFC," draft-mackie-bess-nsh-bgp-control-plane-00, Oct. 14, 2016, 36 pages.
(Continued)

*Primary Examiner* — Gregory B Sefcheck
*Assistant Examiner* — Joshua Smith
(74) *Attorney, Agent, or Firm* — Conley Rose, P.C.

(57) ABSTRACT

A method for synchronizing topology information in a service function chain (SFC) network, where the SFC network includes at least one classifier (CF) and at least one service function forwarder (SFF). The method includes that a first network element in the at least two routing network elements establishes a Border Gateway Protocol (BGP) connection to at least one second network element other than the first network element in the at least two routing network elements, where the first network element is any one of the at least two routing network elements, and the first network element sends a first BGP update message to the at least one second network element, where the first BGP update message includes topology information of the first network element such that the at least one second network element obtains the topology information of the first network element.

20 Claims, 6 Drawing Sheets

(56) References Cited

U.S. PATENT DOCUMENTS

| | | | |
|---|---|---|---|
| 2002/0165981 A1* | 11/2002 | Basturk | H04L 45/028 709/242 |
| 2003/0130832 A1 | 7/2003 | Schulter et al. | |
| 2003/0174653 A1* | 9/2003 | Basu | H04L 45/52 370/238 |
| 2005/0086367 A1 | 4/2005 | Conta et al. | |
| 2005/0207447 A1 | 9/2005 | Sekiguchi et al. | |
| 2006/0133390 A1* | 6/2006 | Sreekantiah | H04L 45/02 370/401 |
| 2006/0164975 A1* | 7/2006 | Filsfils | H04L 45/28 370/225 |
| 2006/0164995 A1* | 7/2006 | Djernaes | H04L 45/306 370/238 |
| 2006/0171404 A1* | 8/2006 | Nalawade | H04L 45/02 370/401 |
| 2012/0020364 A1 | 1/2012 | Zinjuwadia et al. | |
| 2012/0239796 A1* | 9/2012 | Narasappa | H04L 41/142 709/224 |
| 2012/0327811 A1 | 12/2012 | Nozaki | |
| 2013/0117449 A1* | 5/2013 | Hares | H04L 45/04 709/225 |
| 2013/0266011 A1 | 10/2013 | Nachum et al. | |
| 2014/0237138 A1* | 8/2014 | Xu | H04L 45/302 709/238 |
| 2015/0358235 A1 | 12/2015 | Zhang et al. | |
| 2015/0381493 A1 | 12/2015 | Bansal et al. | |
| 2016/0014016 A1* | 1/2016 | Guichard | H04L 45/64 709/226 |
| 2016/0028640 A1 | 1/2016 | Zhang et al. | |
| 2016/0119253 A1 | 4/2016 | Kang et al. | |
| 2016/0134531 A1 | 5/2016 | Assarpour et al. | |
| 2016/0248860 A1* | 8/2016 | Dunbar | H04L 67/146 |
| 2016/0285740 A1* | 9/2016 | Yang | H04L 65/607 |
| 2016/0352619 A1 | 12/2016 | Gattani | |
| 2017/0012799 A1 | 1/2017 | Jiang et al. | |
| 2017/0064039 A1* | 3/2017 | Shen | H04L 45/306 |
| 2017/0099194 A1 | 4/2017 | Wei | |
| 2017/0111267 A1 | 4/2017 | Lin et al. | |
| 2017/0155582 A1 | 6/2017 | Xu et al. | |
| 2017/0244631 A1* | 8/2017 | Guichard | H04L 45/306 |
| 2017/0250903 A1* | 8/2017 | Rasanen | H04L 45/306 |
| 2017/0279938 A1 | 9/2017 | You et al. | |
| 2017/0289271 A1* | 10/2017 | Seed | H04L 67/141 |
| 2017/0310588 A1 | 10/2017 | Zuo | |
| 2017/0339130 A1* | 11/2017 | Reddy | H04L 69/326 |
| 2018/0013674 A1 | 1/2018 | Nainar et al. | |

FOREIGN PATENT DOCUMENTS

| | | |
|---|---|---|
| CN | 102111316 A | 6/2011 |
| CN | 103618677 A | 3/2014 |
| CN | 104184666 A | 12/2014 |
| CN | 104954274 A | 9/2015 |
| CN | 105337852 A | 2/2016 |
| CN | 105379218 A | 3/2016 |
| CN | 105591978 A | 5/2016 |
| CN | 105743822 A | 7/2016 |
| CN | 105812257 A | 7/2016 |
| CN | 105379218 B | 9/2018 |
| EP | 2963866 A2 | 1/2016 |
| EP | 3148149 A1 | 3/2017 |
| JP | 2010178310 A | 8/2010 |
| JP | 2016039467 A | 3/2016 |
| JP | 2016152480 A | 8/2016 |
| JP | 2017518710 A | 7/2017 |
| JP | 2017536761 A | 12/2017 |
| KR | 20160047983 A | 5/2016 |
| WO | 2016004556 A1 | 1/2016 |
| WO | 2016023499 A1 | 2/2016 |

OTHER PUBLICATIONS

Foreign Communication From A Counterpart Application, European Application No. 17842876.9, Extended European Search Report dated Jun. 19, 2019, 11 pages.
Machine Translation and Abstract of Japanese Publication No. JP2010178310, Aug. 12, 2010, 17 pages.
Machine Translation and Abstract of Japanese Publication No. JP2016152480, Aug. 22, 2016, 25 pages.
Foreign Communication From A Counterpart Application, Japanese Application No. 2019-511451, Japanese Office Action dated Jan. 27, 2020, 4 pages.
Foreign Communication From A Counterpart Application, Japanese Application No. 2019-511451, English Translation of Japanese Office Action dated Jan. 27, 2020, 5 pages.
Dolson, D., et al, "Hierarchical Service Function Chaining (hSFC)," draft-dolson-sfc-hierarchical-06, Jun. 27, 2016, 23 pages.
Kumar, S., et al, "Service Function Chaining Use Cases In Data Centers," draft-ietf-sfc-dc-use-cases-05, Aug. 10, 2016, 23 pages.
"Network Functions Virtualisation (NFV); Ecosystem; Report on SDN Usage in NFV Architectural Framework," ETSI GS NFV-EVE 005, V1.1.1, Dec. 2015, 125 pages.
Halpern, J., et al, "Service Function Chaining (SFC) Architecture." RFC 7665, Oct. 2015, 32 pages.
Foreign Communication From A Counterpart Application, PCT Application No. PCT/CN2017/098294, English Translation of International Search Report dated Nov. 27, 2017, 2 pages.
Foreign Communication From A Counterpart Application, PCT Application No. PCT/CN2017/098294, English Translation of Written Opinion dated Nov. 27, 2017, 4 pages.
Machine Translation and Abstract of Chinese Publication No. CN1780250, May 31, 2006, 8 pages.
Machine Translation and Abstract of Chinese Publication No. CN102111316, Jun. 29, 2011, 7 pages.
Machine Translation and Abstract of Chinese Publication No. CN103618677, Mar. 5, 2014, 20 pages.
Machine Translation and Abstract of Chinese Publication No. CN105812257, Jul. 27, 2016, 26 pages.
Machine Translation and Abstract of Japanese Publication No. JP2016039467, Mar. 22, 2016, 18 pages.
Foreign Communication From A Counterpart Application, Chinese Application No. 201610741800.8, Chinese Office Action dated Nov. 4, 2019, 11 pages.
"WT-221a1, TR-221 Amendment 1," Revision: 07, Revision Date: Jun. 2013, 26 pages.
Arimura, J, "MPLS Japan 2014 Example of Service Chaining in Virtual NW," Juniper Networks Corporation Technology Management Headquarters, With the English Translation, 2014, 54 pages.
Fernando, R., et al, "Service Chaining using Virtual Networks with BGP VPNs," draft-ietf-bess-service-chaining-00, Apr. 13, 2016, 41 pages.
"Service Chaining MX Series Configuration," Techlibrary—Juniper Networks, Sep. 2015, 2 pages.

* cited by examiner

METHOD FOR SYNCHRONIZING TOPOLOGY INFORMATION IN SFC NETWORK, AND ROUTING NETWORK ELEMENT

CROSS-REFERENCE TO RELATED APPLICATIONS

This application is a continuation of International Patent Application No. PCT/CN2017/098294 filed on Aug. 21, 2017, which claims priority to Chinese Patent Application No. 201610741800.8 filed on Aug. 26, 2016. The disclosures of the aforementioned applications are hereby incorporated by reference in their entireties.

TECHNICAL FIELD

The present disclosure relates to the field of communications technologies, and in particular, to a method for synchronizing topology information in a service function chain (SFC) network, and a routing network element.

BACKGROUND

An SFC is a new service deployment model in which a chain and a processing sequence of a plurality of service functions (SFs) are defined, to provide a service required by a user.

An architecture of an SFC network mainly includes the following network elements An SF provides various services for the user, such as antivirus, a firewall, application caching and acceleration, and web page optimization, a classifier (CF) is configured to receive a packet, classify the packet based on a tenant type, or 5-tuple information (including a source Internet Protocol (IP) address, a source port number, a destination IP address, a destination port number, and a transport layer protocol) and the like of the packet, and determine a service path of the classified packet based on a forwarding table, and an SF forwarder (SFF) is configured to forward the packet to a corresponding SF based on the service path determined by the CF, and forward the packet to a next-hop SFF or CF after the SF completes processing.

The CF needs to obtain topology information in the entire SFC network. The topology information in the SFC network is used to generate a forwarding table. After receiving a packet, the CF needs to determine a service path of the packet based on the forwarding table.

However, currently topology information cannot be synchronized between different network elements in the SFC network, and a user needs to manually enter the topology information of the network elements. This is not only time-consuming but also error-prone.

SUMMARY

This application provides a method for synchronizing topology information in an SFC network, and a routing network element, to synchronize topology information between different network elements in the SFC network.

According to a first aspect, this application provides a method for synchronizing topology information in an SFC network, where the SFC network includes at least two routing network elements, and the at least two routing network elements include at least one CF and at least one SFF. A first network element in the at least two routing network elements establishes a Border Gateway Protocol (BGP) connection to at least one second network element other than the first network element in the at least two routing network elements. The first network element is any one of the at least two routing network elements. The BGP connection between the first network element and the at least one second network element may be established in a full-mesh manner or using a route reflector (RR). The first network element sends a first BGP update message to the at least one second network element, where the first BGP update message includes topology information of the first network element such that the at least one second network element obtains the topology information of the first network element.

Because the first network element may be any network element in the SFC network, that is, any network element in the SFC network may send a BGP update message to one or more network elements to which the network element establishes a BGP connection, topology information of the network element is synchronized between the one or more network elements to which the network element establishes a BGP connection. After topology information of some or all routing network elements in the SFC network is synchronized in the foregoing manner, a workload of manually entering the topology information can be greatly reduced, or even the topology information does not need to be manually entered, and the topology information is synchronized in the entire SFC network only using a BGP update message sent between the routing network elements.

In an optional implementation, the first network element establishes a full-mesh BGP connection to the at least one second network element.

In an optional implementation, the first network element is configured as an RR. The first network element receives a second BGP update message sent by a network element A in the at least one second network element, where the second BGP update message includes topology information of the network element A. The first network element sends a third BGP update message to a network element B other than the network element A in the at least one second network element, where the third BGP update message includes the topology information of the network element A. When the network element A is a client network element, the network element B is each client network element and non-client network element other than the network element A in the at least one second network element. When the network element A is a non-client network element, the network element B is each client network element other than the network element A in the at least one second network element. In this implementation, one or some routing network elements are used as an RR to synchronize topology information between routing network elements between which no BGP connection is established. In addition, because a BGP connection may not be directly established between routing network elements, a quantity of BGP connections is reduced, and a quantity of resources consumed when a BGP update message is sent between the routing network elements to synchronize topology information is reduced.

In an optional implementation, when the first network element is an SFF, the topology information of the first network element includes an identifier of the first network element, and information about an SF connected to the first network element or information about a subdomain connected to the first network element, where the information about the SF connected to the first network element includes an identifier of the SF and a service type of the SF, and the information about the subdomain connected to the first network element includes an identifier of the subdomain, a service type of the subdomain, and an identifier of a top-level CF in the subdomain.

In an optional implementation, when the first network element is a top-level CF in a first subdomain and the first network element establishes a BGP connection to at least one upper-level SFF, the first network element determines that topology information in the first subdomain is successfully synchronized, and generates a service digest of the first subdomain based on the topology information of routing network elements in the first subdomain, where the service digest of the first subdomain includes an identifier of the first subdomain and a service type of the first subdomain, and the first network element sends a fourth BGP update message to the at least one upper-level SFF, where the fourth BGP update message includes the service digest of the first subdomain. In this implementation, a top-level CF in a subdomain can generate a service digest of the subdomain based on topology information in the subdomain, and send, using a BGP update message, the service digest of the subdomain to an upper-level SFF connected to the subdomain such that the upper-level SFF connected to the subdomain can synchronize the service digest of the subdomain at a level of the upper-level SFF using a BGP update message.

In an optional implementation, the SFC network includes a first autonomous system (AS) domain and a second AS domain. When the first network element is a top-level CF in the first AS domain and the first network element establishes a BGP connection to a top-level CF in the second AS domain, the first network element determines that topology information in the first AS domain is successfully synchronized, and generates a service digest of the first AS domain based on the topology information of routing network elements in the first AS domain, where the service digest of the first AS domain includes an identifier of the first AS domain and a service type of the first AS domain, and the first network element sends a fifth BGP update message to the top-level CF in the second AS domain, where the fifth BGP update message includes the service digest of the first AS domain. In this implementation, a top-level CF in an AS domain can generate a service digest of the AS domain based on topology information in the AS domain, and send the service digest of the AS domain to a top-level CF in another AS domain using a BGP update message, to synchronize the service digest of the AS domain between different AS domains such that each AS domain determines a routing policy based on a service digest of another AS domain.

In an optional implementation, the first network element obtains a forwarding table, where the forwarding table may be any one of an intra-SFC-domain forwarding table, a forwarding table at each level in an AS domain, or an inter-AS-domain forwarding table, and the first network element may generate the forwarding table, or may obtain the forwarding table from another network element. The first network element sends a sixth BGP update message to the at least one second network element, where the sixth BGP update message includes the forwarding table such that the at least one second network element obtains the forwarding table. In this implementation, a routing network element can synchronize a forwarding table using a BGP update message. Therefore, not only efficiency is relatively high, but also overheads are relatively low such that the following other approaches problem is resolved. When a forwarding table is synchronized according to the Network Configuration Protocol (NETCONF), the forwarding table needs to be delivered to all devices one by one, causing a relatively large quantity of controller overheads.

In an optional implementation, the first network element is configured as an RR. The first network element receives a seventh BGP update message that is sent by the network element A and that carries a forwarding table, and the first network element sends, to the network element B, an eighth BGP update message that carries the forwarding table. When the network element A is a client network element, the network element B is each client network element and non-client network element other than the network element A in the at least one second network element. When the network element A is a non-client network element, the network element B is each client network element other than the network element A in the at least one second network element. In this implementation, a routing network element used as an RR forwards a forwarding table such that the forwarding table is synchronized between network elements between which no BGP connection is established such that the forwarding table is synchronized when there is a relatively small quantity of BGP interconnections.

In an optional implementation, the first BGP update message carries the topology information of the first network element using a multiprotocol reachable network layer reachability information (MP_REACH_NLRI) field.

According to a second aspect, this application provides a method for synchronizing a forwarding table in an SFC network, where the SFC network includes at least two routing network elements, the at least two routing network elements include at least one CF and at least one SFF, and the method includes establishing, by a first network element in the at least two routing network elements, a BGP connection to at least one second network element other than the first network element in the at least two routing network elements, where the first network element is any one of the at least two routing network elements, obtaining, by the first network element, the forwarding table, and sending, by the first network element, a BGP update message to the at least one second network element, where the BGP update message includes the forwarding table such that the at least one second network element obtains the forwarding table. In this implementation, a routing network element can synchronize a forwarding table using a BGP update message. Therefore, not only efficiency is relatively high, but also overheads are relatively low such that the following other approaches problem is resolved. When a forwarding table is synchronized according to the NETCONF, the forwarding table needs to be delivered to all devices one by one, causing a relatively large quantity of controller overheads.

According to a third aspect, this application provides a routing network element, where the routing network element is configured to execute the method in any one of the first aspect, or the possible implementations of the first aspect. Further, the routing network element includes modules configured to execute the method in any one of the first aspect, or the possible implementations of the first aspect.

According to a fourth aspect, this application provides a routing network element, where the routing network element is configured to execute the method in any one of the second aspect, or the possible implementations of the second aspect. Further, the routing network element includes modules configured to execute the method in any one of the second aspect, or the possible implementations of the second aspect.

According to a fifth aspect, this application provides a routing network element. The routing network element includes a processor, a memory, and an interface. The memory is configured to store a packet, the interface is configured to establish a BGP connection to another routing network element, and transmit a BGP update message, and the processor is configured to execute the method in any one of the first aspect, or the possible implementations of the first aspect using the memory and the interface.

According to a sixth aspect, this application provides a routing network element. The routing network element includes a processor, a memory, and an interface. The memory is configured to store a packet, the interface is configured to establish a BGP connection to another routing network element, and transmit a BGP update message, and the processor is configured to execute the method in any one of the second aspect, or the possible implementations of the second aspect using the memory and the interface.

According to a seventh aspect, this application provides an SFC system. The system includes at least two routing network elements, and the at least two routing network elements include at least one CF and at least one SFF. Each of the at least two routing network elements is configured to execute the method in any one of the first aspect, or the possible implementations of the first aspect.

According to an eighth aspect, this application provides an SFC system. The system includes at least two routing network elements, and the at least two routing network elements include at least one CF and at least one SFF. Each of the at least two routing network elements is configured to execute the method in any one of the second aspect, or the possible implementations of the second aspect.

According to a ninth aspect, this application provides a computer readable medium configured to store a computer program. The computer program includes an instruction used to execute the method in any one of the first aspect, or the possible implementations of the first aspect.

According to a tenth aspect, this application provides a computer readable medium configured to store a computer program. The computer program includes an instruction used to execute the method in any one of the second aspect, or the possible implementations of the second aspect.

In this application, on the basis of the implementations provided in the foregoing aspects, the implementations may be further combined to provide more implementations.

BRIEF DESCRIPTION OF DRAWINGS

To describe the technical solutions in some of the embodiments of this application more clearly, the following briefly describes the accompanying drawings describing some of the embodiments. The accompanying drawings in the following description show merely some embodiments of this application, and a person of ordinary skill in the art may still derive other drawings from these accompanying drawings without creative efforts.

DESCRIPTION OF EMBODIMENTS

The following describes the technical solutions of this application in detail with reference to accompanying drawings and specific embodiments. It should be understood that the embodiments of this application and specific features in the embodiments are intended to describe the technical solutions of this application in detail rather than limit the technical solutions of this application. The embodiments of this application and the technical features in the embodiments may be mutually combined if they do not conflict with each other.

For ease of understanding the embodiments of this application, several elements used in descriptions of the embodiments of this application are first described herein.

(1) An SFC network is a general term for networks in which service deployment is performed based on an SFC model. The SFC network may include the following network architectures based on different topology structures.

Type 1: Intra-SFC-Domain Network.

Figure 1:
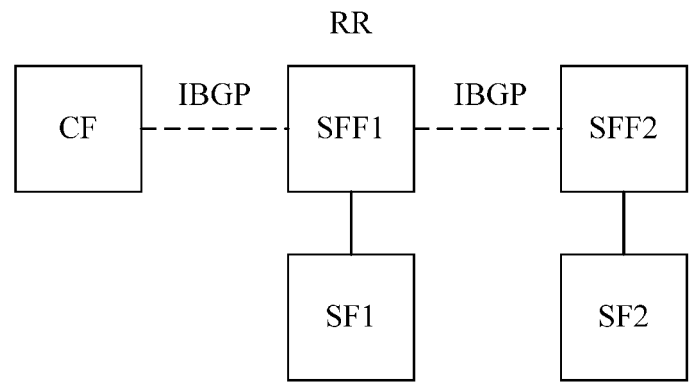
FIG. 1 is a schematic diagram of an intra-SFC-domain network according to an embodiment of this application.

The intra-SFC-domain network includes one CF, one or more SFFs, and a plurality of SFs. FIG. 1 is a possible schematic diagram of an intra-SFC-domain network.

Type 2: Intra-AS-Domain Network.

Figure 2:
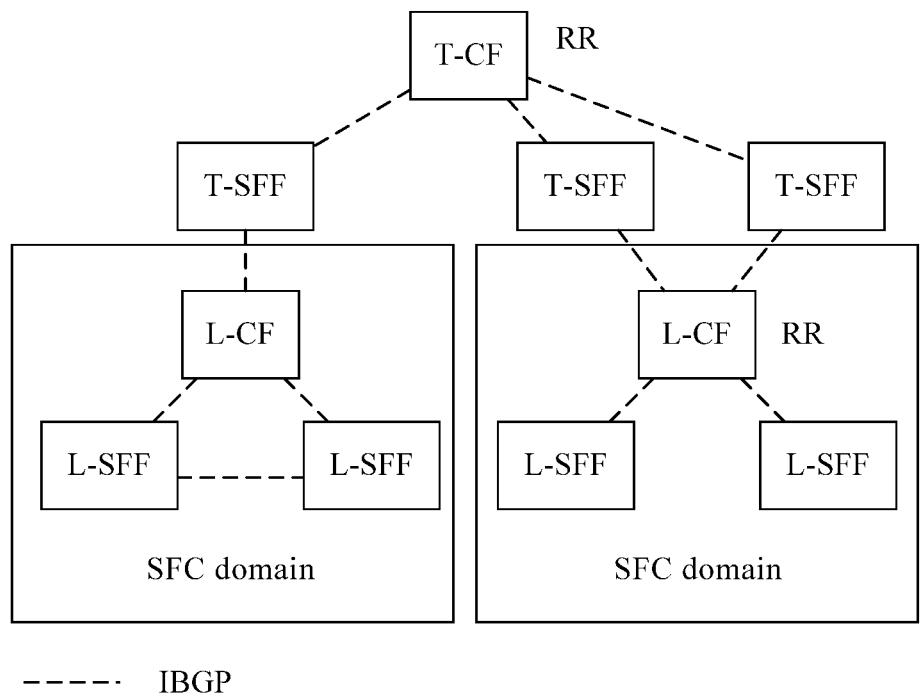
FIG. 2 is a schematic diagram of an intra-autonomous system (AS)-domain network according to an embodiment of this application.

The intra-AS-domain network includes one or more SFC domains. Each SFC domain is connected to one SFF, and the SFC domain connected to the SFF may be referred to as a subdomain. When an AS domain includes two or more SFC domains, a hierarchical concept is proposed to facilitate SFC network management in the AS domain. A top level includes a CF, one or more SFFs, and a subdomain connected to the SFF. In the intra-AS-domain network, a top-level subdomain is an SFC domain or an SF, and each subdomain is a low level. To distinguish between a top-level network element and a low-level network element, in the embodiments of this application, a top-level CF and a top-level SFF are denoted as a T-CF and a T-SFF respectively, and a low-level CF and a low-level SFF are denoted as an L-CF and an L-SFF respectively. FIG. 2 is a schematic diagram of a possible case of an intra-AS-domain network.

An SFF in the subdomain may further be connected to a lower-level subdomain in addition to an SF, and this presents a nested structure. That is, the subdomain may also have a multi-level structure. The embodiments of this application are intended to protect a synchronization solution that is of topology information and/or a forwarding table and that is based on the nested structure.

Type 3: Inter-AS-Domain Network

Figure 3:
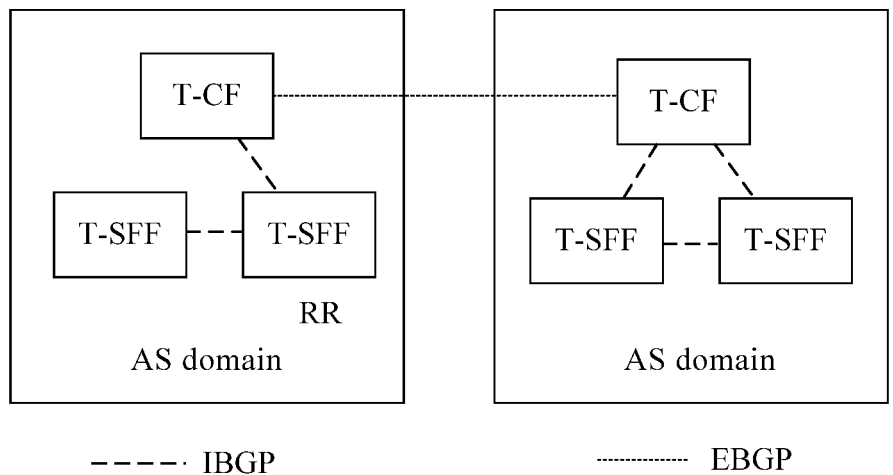
FIG. 3 is a schematic diagram of an inter-AS-domain network according to an embodiment of this application.

The inter-AS-domain network includes two or more AS domains. A network including two connected AS domains is used as an example, where an SFF at the end of an SFC in a first AS domain is connected to a CF in a second AS domain such that after processing a packet, the first AS domain forwards the packet to the second AS domain for further processing. FIG. 3 is a schematic diagram of a possible case of an inter-AS-domain network.

It should be noted that the foregoing three types of SFC networks in the embodiments of this application are only abstraction of an actual network. In an embodiment, the SFC network may further include another network element, and the CF and the SFF, and the SFF and the SF or the SFC domain are not merely directly connected, and may further be connected using another network element. For example, the SFF may be connected to the SF using an SFC proxy. The embodiments of this application are intended to include these variants.

(2) A routing network element is a general term for network elements used for packet routing in the embodiments of this application, for example, a CF and an SFF.

(3) A service digest of a subdomain/AS domain includes an identifier and a service type of the subdomain/AS domain. The service type is information that is obtained by abstracting topology information in the subdomain/AS domain and that indicates an SF type of the subdomain/AS domain. For example, if a service type of a subdomain may be "firewall, two," it indicates that the subdomain includes two structures for implementing a firewall.

(4) The BGP is a routing protocol of an AS.

(5) A BGP connection is a connection established between network elements according to the BGP protocol. The BGP connection may include an internal BGP (IBGP) connection and an external BGP (EBGP) connection based on whether interconnected network elements are in a same AS domain. The IBGP connection is a BGP connection established between network elements in a same AS domain, and the EBGP connection is a BGP connection established between network elements in different AS domains.

During BGP connection establishment between a plurality of network elements to implement connectivity between any two network elements, a BGP connection may be established in a full-mesh manner, or a BGP connection may be established using an RR.

A BGP connection between N network elements is used as an example. When a BGP connection is established in the full-mesh manner, each of the N network elements establishes a BGP connection to remaining N-1 network elements.

When a BGP connection is established using the RR, at least one network element in N networks is configured as an RR. Each RR network element establishes a BGP connection to a plurality of non-RR network elements to form an RR cluster, and a BGP connection may also be established between network elements in different RR clusters. The non-RR network elements to which the RR network element establishes a BGP connection may further include a client network element and a non-client network element. After receiving a BGP packet sent by the client network element, the RR network element forwards information carried in the packet to a client network element and non-client network element other than the client network element. After receiving a BGP packet sent by the non-client network element, the RR forwards information carried in the packet to all client network elements.

It should be noted that, when a BGP connection is established between the plurality of network elements in the embodiments of this application using the RR, there may be more than one RR. In addition, network elements other than the RR in the plurality of network elements may be all client network elements or all non-client network elements, or may include some client network elements and some non-client network elements. In addition, when a BGP connection is established between the plurality of network elements, a BGP connection may be established between a first part of network elements in the full-mesh manner or using the RR, a BGP connection is established between a second part of network elements in the full-mesh manner or using the RR, and a BGP connection is established between one of the first part of network elements and one of the second part of network elements.

(6) A BGP update message is a BGP-based packet. In the embodiments of this application, an original definition of the BGP update message is extended: A new field is added to a packet structure of the BGP update message or an existing field in the BGP update message is redefined. Topology information and/or a forwarding table are/is carried using the newly-added field or the redefined field such that topology information and/or a forwarding table of a network are/is synchronized between network elements by sending a BGP update message between the network elements. For example, an MP_REACH_NLRI field is newly added to the BGP update message, and the topology information and/or the forwarding table of the network are/is carried using the newly-added MP_REACH_NLRI field.

(7) A forwarding table is also referred to as a routing directory that specifies network elements by which a type of packet needs to be processed. The forwarding table may be generated by a CF, an SFF, or a controller in an SFC network. A specific manner of generating the forwarding table is not limited in the embodiments of this application.

A form of the forwarding table may vary with an architecture of the SFC network, including a forwarding table in an intra-SFC-domain network, a low-level forwarding table in an intra-AS-domain network, a top-level forwarding table in the intra-AS-domain network, an inter-AS-domain forwarding table, and the like. The low-level forwarding table in the intra-AS-domain network may be considered as the forwarding table in the intra-SFC-domain network.

Based on flexibility of a forwarding path defined in the forwarding table, the forwarding table may further include a strict path forwarding table, a loose path forwarding table, and a relatively strict path forwarding table between the strict path forwarding table and the loose path forwarding table.

The absolute strict forwarding table means that a determined network element identifier is specified in the forwarding table for each hop. However, in the loose path forwarding table, only a service type of a network element on each hop is specified, and the SFF selects, as a next-hop network element, one network element from a plurality of network elements of this service type. The relative strict path forwarding table means that a determined network element identifier is specified in the forwarding table for some hops, and only a network element type is specified for other hops.

The low-level forwarding table in the intra-AS-domain network is used as an example. The strict path forwarding table is, for example, L-SFF id (1)→SF id (1)→L-SFF id (2)→SF id (2), and the loose path forwarding table is L-SF type (1)→L-SF type (2)→L-SF type (3).

The top-level forwarding table in the intra-AS-domain network is used as an example. The strict path forwarding table is T-SFF id (1)→SFC domain id (1)→T-SFF id (2)→SFC domain id (2), and the loose path forwarding table is Service Type(1)→Service Type(2)→Service Type(3), where Service Type is a service type of an SFC domain.

Figure 4:
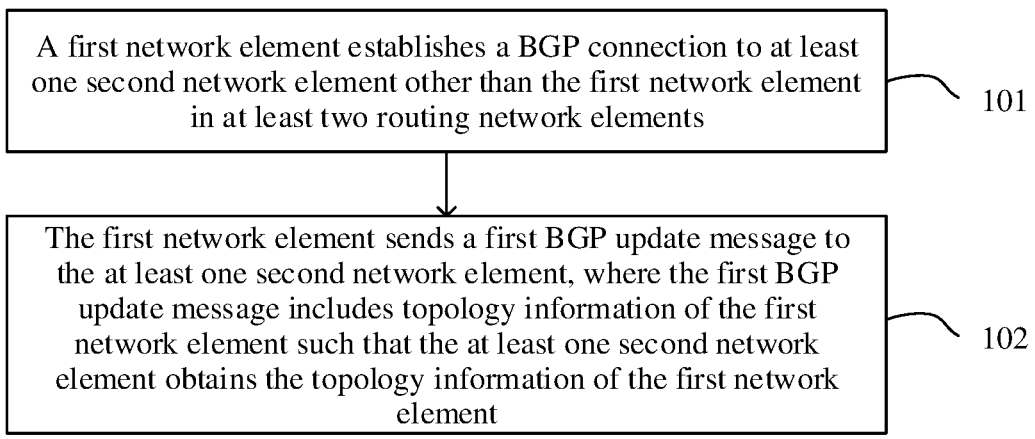
FIG. 4 is a schematic flowchart of a method for synchronizing topology information in an SFC network according to an embodiment of this application.

FIG. 4 is a schematic diagram of a method for synchronizing topology information in an SFC network according to an embodiment of this application. The SFC network includes at least two routing network elements. The at least two routing network elements include at least one CF and at least one SFF. The method is executed by a first network element in the at least two routing network elements, and the first network element is any one of the at least two routing network elements. The method for synchronizing topology information in an SFC network includes the following steps.

Step 101: The first network element establishes a BGP connection to at least one second network element other than the first network element in the at least two routing network elements.

Further, in this embodiment of this application, a network element to which the first network element establishes a BGP connection is referred to as a second network element, and there may be one or more second network elements. The first network element may establish a BGP connection to any second network element using an RR. Alternatively, when there is a plurality of second network elements, the first network element may establish a BGP connection to the plurality of second network elements in a full-mesh manner. Alternatively, the first network element may establish a BGP connection to some second network elements in a full-mesh manner, and establish a BGP connection to other second network elements using an RR.

In addition, when the first network element and the second network element belong to a same AS domain, the BGP connection between the first network element and the second network element is an IBGP connection. When the first network element and the second network element belong to different AS domains, the BGP connection between the first network element and the second network element is an EBGP connection.

Step 102: The first network element sends a first BGP update message to the at least one second network element, where the first BGP update message includes topology information of the first network element such that the at least one second network element obtains the topology information of the first network element.

Further, the topology information of the first network element includes an identifier of the first network element and identity information of the first network element, and the identity information of the first network element is used to indicate whether the first network element is a CF or an SFF. The identifier of the first network element may be a physical address or an IP address of the first network element, or may be another identifier that can be used for distinguishing between different network elements.

The identity information of the first network element may be implemented using a character representing an identity, or may be implemented by adding the identifier of the first network element to a preset field of a packet. In the latter implementation of the identity information of the first network element, for example, if an identifier 1 is added to a first location in a BGP update message, it indicates that the BGP update message carries an identifier of a CF, and the identifier of the CF is the identifier 1, or if an identifier 2 is added to a second location in a BGP update message, it indicates that the BGP update message carries an identifier of an SFF, and the identifier of the SFF is the identifier 2.

When the first network element is an SFF, the topology information of the first network element further includes information about an SF or a subdomain that is connected to the SFF. The information about the SF includes an identifier, a service type, and the like of the SF. The information about the subdomain may be a set of topology information of all network elements in the subdomain, or may be an identifier of a top-level CF in the subdomain and a service digest obtained after topology information in the subdomain is abstracted.

In this embodiment of this application, the BGP update message may be extended such that a field (for example, an MP_REACH_NLRI field) in the BGP update message can carry topology information of a network element. The first network element sends, to each second network element, the first BGP update message that carries the topology information of the first network element, to synchronize the topology information of the first network element between the second network elements.

Because the first network element may be any network element in the SFC network, that is, any one network element in the SFC network may perform step 101 and step 102 to establish a BGP connection to one or more network elements other than the network element in the SFC network, and send a BGP update message to the one or more network elements to which the network element establishes a BGP connection, topology information of the network element is synchronized between the one or more network elements to which the network element establishes a BGP connection. After topology information of some or all routing network elements in the SFC network is synchronized in the foregoing manner, a workload of manually entering the topology information can be greatly reduced, or even the topology information does not need to be manually entered, and the topology information is synchronized in the entire SFC network only using a BGP update message sent between the routing network elements.

Optionally, in this embodiment of this application, the topology information of the first network element further includes information indicating a level of the first network element. An intra-AS-domain network is used as an example. Although both a T-CF and an L-CF are of a CF type, the T-CF and the L-CF belong to different levels. The T-CF may add, to topology information of the T-CF, information indicating that the T-CF is a top-level CF. The information may be represented by a character, or may be implemented by adding the identifier of the first network element to a preset field location. For example, if an identifier 1 is added to a first location in a BGP update message, it indicates that the BGP update message carries an identifier of a top-level CF, and the identifier of the top-level CF is the identifier 1, or if an identifier 3 is added to a third location in a BGP update message, it indicates that the BGP update message carries an identifier of a low-level CF, and the identifier of the low-level CF is the identifier 3.

Optionally, in this embodiment of this application, the topology information of the first network element may further include performance information such as a processing capability of the network element.

Optionally, this embodiment of this application further provides a synchronization solution of topology information in the entire SFC network, and the solution includes the following implementations.

Manner 1: A BGP connection is established between all routing network elements in the entire SFC network in the full-mesh manner. Each routing network element performs step 102 to send topology information of the routing network element to remaining routing network elements. In this way, each routing network element can obtain topology information of all the routing network elements except the routing network element. That is, each routing network element includes the topology information in the entire SFC network.

A variant of Manner 1 is as follows. Routing network elements in the entire SFC network belong to different levels, and a BGP connection is established between routing network elements at each level in the full-mesh manner, and the routing network element at each level synchronizes topology information at the level by performing step 102. A lower-level CF may establish a BGP connection to an upper-level SFF, and send a service digest or complete topology information of a lower level to the upper-level SFF using a BGP update message such that the upper-level SFF can synchronize, at an upper level, the service digest or the topology information of the lower level connected to the upper level. Similarly, the upper-level SFF may also send topology information of the upper-level SFF to the lower-level CF using a BGP update message such that the lower-level CF can synchronize the topology information of the upper-level SFF at the lower level.

Manner 2: Any one of the at least two routing network elements establishes a BGP connection to at least one another routing network element, and one or more routing network elements of the any routing network element and the at least one another routing network element are configured as an RR in the BGP connection. After receiving a BGP update message that is sent by another routing network element and that carries topology information, the routing network element configured as an RR extracts the topology information from the BGP update message, and forwards the topology information to another routing network element using a BGP update message, to synchronize topology information between two routing network elements between which no BGP connection is established.

Figure 5:
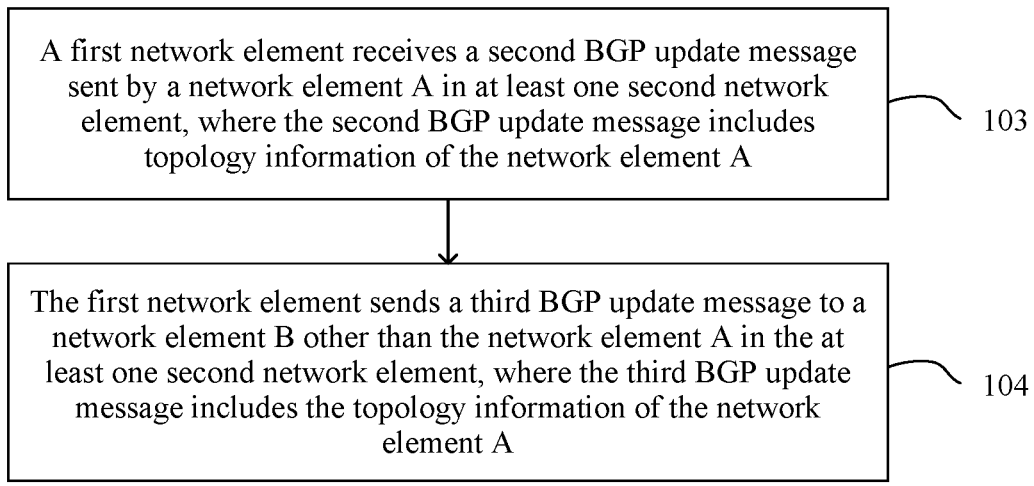
FIG. 5 is another schematic flowchart of a method for synchronizing topology information in an SFC network according to an embodiment of this application.

An example in which the first network element is used as an RR is used. Referring to FIG. 5, after step 101, the method further includes the following steps.

Step 103: The first network element receives a second BGP update message sent by a network element A in the at least one second network element, where the second BGP update message includes topology information of the network element A.

Step 104: The first network element sends a third BGP update message to a network element B other than the network element A in the at least one second network element, where the third BGP update message includes the topology information of the network element A.

When the network element A is a client network element, the network element B is each client network element and non-client network element other than the network element A in the at least one second network element. When the network element A is a non-client network element, the network element B is each client network element other than the network element A in the at least one second network element.

In the foregoing manner, one or some routing network elements are used as an RR to synchronize topology information between routing network elements between which no BGP connection is established. In addition, because a BGP connection may not be directly established between routing network elements, a quantity of BGP connections is reduced, and a quantity of resources consumed when a BGP update message is sent between the routing network elements is reduced.

It should be noted that, in an actual SFC network, a first part of routing network elements may establish a BGP connection in the full-mesh manner, a second part of routing network elements may establish a BGP connection using the RR, and the two parts of routing network elements overlap, or one of a first part of routing network elements establishes a BGP connection to one of a second part of routing network element, to synchronize topology information between the two parts of network elements.

In addition, step 102 to step 104 may be performed when the SFC network is initialized, or step 102 to step 104 may be performed when a network element change is detected in the network, to automatically update the topology information in the SFC network, or step 102 to step 104 may be performed when a network fault is detected to locate a faulty node.

Optionally, in this embodiment of this application, when the first network element is an SFF, in addition to the identifier of the first network element, the topology information of the first network element includes information about an SF connected to the first network element or information about a subdomain connected to the first network element.

The information about the SF connected to the SFF includes an identifier of the SF and a service type of the SF. The SFF may obtain, from a BGP update message sent by the SF to the SFF, the information about the SF connected to the SFF, or may obtain the information about the SF in another other approaches manner. For example, the SF sends information about the SF to the SFF when the SF establishes a connection to the SFF. For another example, the SFF sends a request for obtaining the information about the SF to the SF connected to the SFF.

The information about the subdomain connected to the SFF includes an identifier of the subdomain, a service type of the subdomain, and an identifier of a top-level CF in the subdomain. The information about the subdomain may be sent by the top-level CF in the subdomain to the SFF using a BGP update message. Alternatively, the top-level CF in the subdomain sends topology information of each routing network element in the subdomain to the SFF using a BGP update message, and the SFF abstracts the topology information in the subdomain, to generate a service digest of the subdomain, where the service digest of the subdomain includes the identifier of the subdomain and the service type of the subdomain.

In the foregoing technical solution, the SFF can use, as a part of the topology information of the SFF, the information about the SF or the subdomain that is connected to the SFF, and synchronize the topology information of the SFF to another routing network element using a BGP update message such that the other routing network element learns of the information about the SF or the domain that is connected to the SFF, to perform packet routing based on the information.

Optionally, in this embodiment of this application, a top-level CF in a subdomain can send information about the subdomain to an upper-level SFF. The upper-level SFF uses the information about the subdomain as a part of topology information of the upper-level SFF, and synchronizes the topology information of the upper-level SFF to another routing network element using a BGP update message. When the subdomain has a single-level structure, the top-level CF in the subdomain is a CF at a single level in the subdomain, or when the subdomain has a multi-level structure, the top-level CF in the subdomain is a CF at a top level in the multi-level structure of the subdomain.

Figure 6:
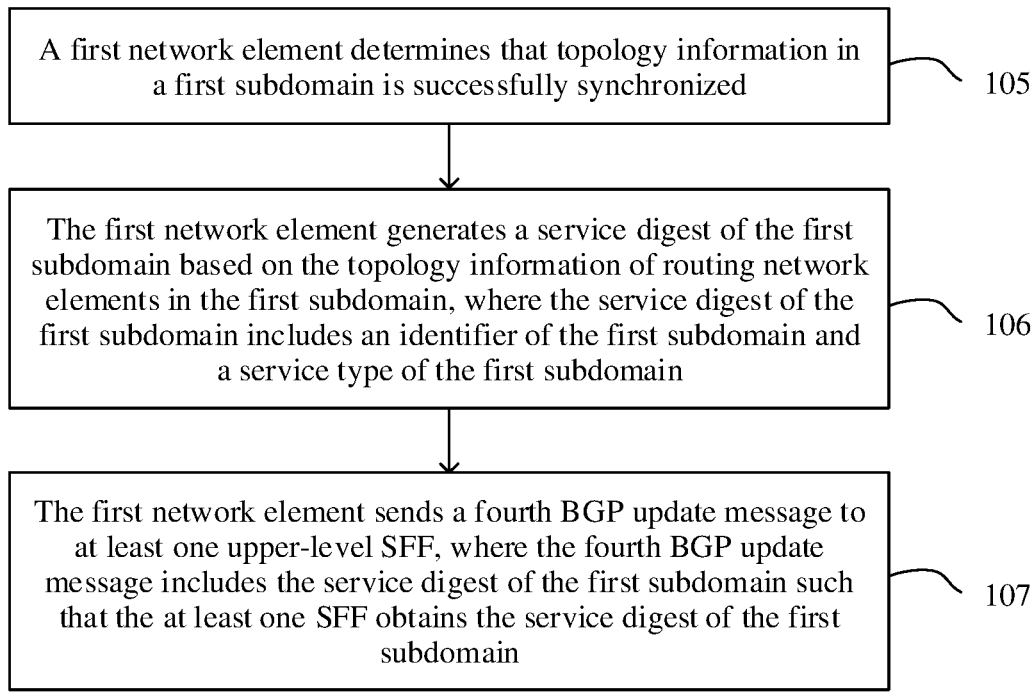
FIG. 6 is still another schematic flowchart of a method for synchronizing topology information in an SFC network according to an embodiment of this application.

For example, the first network element is a top-level CF in a subdomain. The subdomain in which the first network element is located is connected to at least one upper-level SFF, and the first network element establishes a BGP connection to the at least one upper-level SFF. Referring to FIG. 6, after step 102, the method further includes the following steps.

Step 105: The first network element determines that topology information in a first subdomain is successfully synchronized.

Further, there are a plurality of implementations in which the first network element determines that the topology information in the first subdomain is successfully synchronized. For example, the first network element determines, according to a mechanism defined in the Request for Comments (RFC) 4274, whether the topology information in the first subdomain in which the first network element is located is successfully synchronized. For another example, the first network element may perform timing at a moment at which synchronization of the topology message starts, and after a timer times specified duration, may determine that the topology information is successfully synchronized. The specified duration may be an empirical value or duration determined based on a characteristic parameter of the SFC network, for example, duration determined based on a parameter such as a network element quantity or a bandwidth of the SFC network. For another implementation of step 105, examples are not provided one by one in this embodiment of this application.

Step 106: The first network element generates a service digest of the first subdomain based on the topology information of routing network elements in the first subdomain, where the service digest of the first subdomain includes an identifier of the first subdomain and a service type of the first subdomain.

For a specific implementation in which the first network element generates the service digest of the first subdomain based on the topology information of the routing network element in the first subdomain, refer to various other approaches means, and details are not described in this embodiment of this application.

Step 107: The first network element sends a fourth BGP update message to at least one upper-level SFF, where the fourth BGP update message includes the service digest of the first subdomain such that the at least one SFF obtains the service digest of the first subdomain.

When a quantity of the SFF is greater than 1, the first network element may send the service digest of the first subdomain to each upper-level SFF.

It should be noted that, in addition to an identifier of an upper-level SFF and a service digest of a subdomain, topology information of the upper-level SFF may further include an identifier of a top-level CF in the subdomain. The service digest of the subdomain is obtained by performing step 106 by the top-level CF in the subdomain, and the identifier of the top-level CF in the subdomain is obtained by performing step 102 by the CF.

In the foregoing technical solution, a CF in a subdomain can generate a service digest of the subdomain based on topology information in the subdomain, and send, using a BGP update message, the service digest of the subdomain to an upper-level SFF connected to the subdomain such that the upper-level SFF obtains the service digest of the subdomain, and can send the service digest of the subdomain to another routing network element at a level of the upper-level SFF using a BGP update message.

Optionally, in this embodiment of this application, a top-level CF in an AS domain may send information about the AS domain to another AS domain such that the other AS domain determines a routing policy based on the information about the AS domain.

Figure 7:
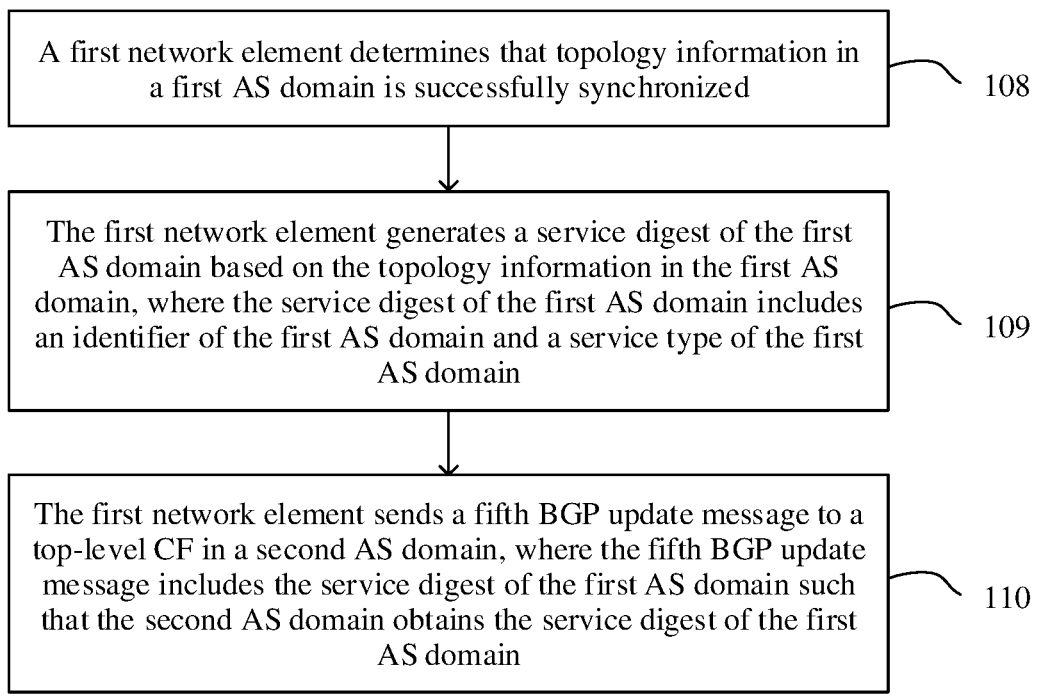
FIG. 7 is yet another schematic flowchart of a method for synchronizing topology information in an SFC network according to an embodiment of this application.

An example in which the SFC network includes a first AS domain and a second AS domain is used. When the first network element is a top-level CF in the first AS domain and the first network element establishes an EBGP connection to a top-level CF in the second AS domain, referring to FIG. 7, a method for synchronizing information between AS domains includes the following steps.

Step 108: The first network element determines that topology information in a first AS domain is successfully synchronized.

Step 109: The first network element generates a service digest of the first AS domain based on the topology information in the first AS domain, where the service digest of the first AS domain includes an identifier of the first AS domain and a service type of the first AS domain.

Step 110: The first network element sends a fifth BGP update message to a top-level CF in a second AS domain, where the fifth BGP update message includes the service digest of the first AS domain such that the second AS domain obtains the service digest of the first AS domain.

An implementation of step 108 is similar to that of step 105, and details are not described herein.

It should be noted that, in addition to a service digest of an AS domain, information about the AS domain may further include an identifier of a top-level CF in the AS domain, and the identifier of the top-level CF in the AS domain may be synchronized according to step 102.

In the foregoing technical solution, a top-level CF in an AS domain can generate a service digest of the AS domain based on topology information in the AS domain, and send the service digest of the AS domain to a top-level CF in another AS domain using a BGP update message, to synchronize the service digest of the AS domain between different AS domains such that each AS domain determines a routing policy based on a service digest of another AS domain.

Figure 8:
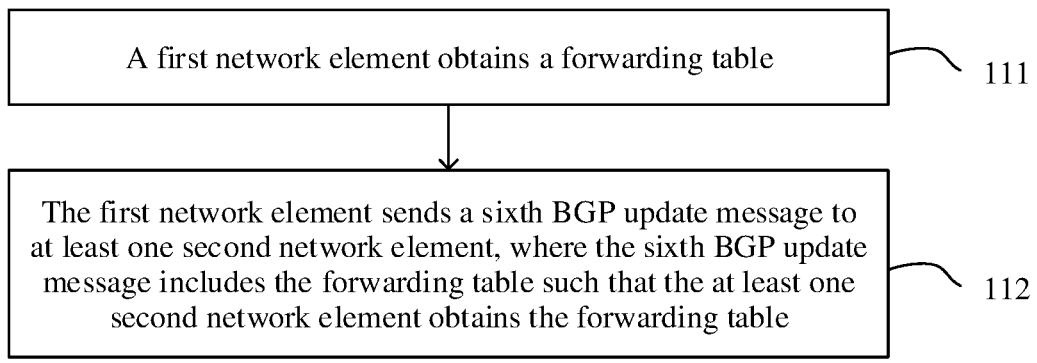
FIG. 8 is a schematic flowchart of a method for synchronizing a forwarding table in an SFC network according to an embodiment of this application.

Optionally, in this embodiment of this application, a forwarding table may further be synchronized between routing network elements using a BGP update message. The first network element is used as an example. Referring to FIG. 8, forwarding table synchronization includes the following steps.

Step 111: The first network element obtains a forwarding table.

Further, the forwarding table in step 111 may be any one of an intra-SFC-domain forwarding table, a low/top-level forwarding table in an AS domain, and an inter-AS-domain forwarding table. The forwarding table may be any one of the foregoing strict path forwarding table, loose path forwarding table, and relatively strict path forwarding table.

The first network element obtains the forwarding table in a plurality of implementations, including but not limited to the following implementations In a first implementation, the first network element generates the forwarding table, and in a second implementation, a controller in the SFC network generates the forwarding table, and the controller actively sends the forwarding table to the first network element, or the first network element requests the forwarding table from the controller.

Step 112: The first network element sends a sixth BGP update message to the at least one second network element, where the sixth BGP update message includes the forwarding table such that the at least one second network element obtains the forwarding table.

Further, after obtaining the forwarding table, the first network element sends, using a BGP update message, the forwarding table to a second network element to which the first network element establishes a BGP connection.

In a possible implementation, when the forwarding table is a forwarding table at a level of the first network element, the first network element may send, only to a routing network element that is at this level and to which the first network element establishes a BGP connection, a BGP update message that carries the forwarding table.

In another possible implementation, when the first network element is a top-level routing network element in an AS domain and the forwarding table is an intra-domain forwarding table, the first network element may send, only to a routing network element that is at the top level and to which the first network element establishes a BGP connection, a BGP update message that carries the forwarding table.

In the foregoing technical solution, a routing network element in the SFC network can synchronize a forwarding table using a BGP update message. Therefore, not only efficiency is relatively high, but also overheads are relatively low such that the following other approaches problem is resolved. When a forwarding table is synchronized according to the NETCONF, the forwarding table needs to be delivered to all devices one by one, causing a relatively large quantity of controller overheads.

Optionally, in this embodiment of this application, when the first network element is configured as an RR, after receiving a seventh BGP update message that is sent by the network element A and that carries a forwarding table, the first network element may send, to the network element B, an eighth BGP update message that carries the forwarding table. For implementations of the network element A and the network element B in this embodiment, refer to implementations of the network element A and the network element B in step 103 to step 104.

In the foregoing technical solution, a routing network element used as an RR forwards a forwarding table such that the forwarding table is synchronized between network elements between which no BGP connection is established such that the forwarding table is synchronized when there is a relatively small quantity of BGP interconnections.

The following describes an improvement to the BGP update message in this embodiment of this application. A new field is added to the BGP update message such that the BGP update message can carry topology information. The following provides a detailed description using an example in which an MP_REACH_NLRI field is added.

Table 1 shows a possible implementation of the added MP_REACH_NLRI field.

TABLE 1

NLRI type
L-level→L-level sub-TLV
L-level→T-level sub-TLV
T-level→L-level sub-TLV
T-level→T-level sub-TLV
Inter AS→AS sub-TLV A sequence of subfields in the MP_REACH_NLRI field is not limited. Meanings of the subfields in the MP_REACH_NLRI field are as follows.

NLRI type is used to indicate that NLRI carries topology information and/or a forwarding table of an SFC network.

L-level→L-level sub-TLV is used to identify information advertised between network elements at a low level (or an intra-SFC-domain network) in an AS domain.

L-level→T-level sub-TLV is used to identify information that is advertised by a network element at a low level in an AS domain to a network element at a top level.

T-level→L-level sub-TLV is used to identify information that is advertised by a network element at a top level in an AS domain to a network element at a low level.

T-level→T-level sub-TLV is used to identify information advertised between network elements at a top level in an AS domain.

Inter AS→AS sub-TLV is used to identify information advertised between network elements in different AS domains.

Table 2 shows a possible implementation of the L-level→L-level sub-TLV subfield.

TABLE 2

Type 1=L-SFF id
Type 2=SF id
Type 3=SF type
Type 4=L-CF id
Type 5=T-SFF id
. . .
Type n=low-level forwarding table A sequence of subfields from Type 1 to Type n is not limited. In addition, when the Type 1 subfield carries identifiers of a plurality of L-SFFs, correspondingly, the Type 2 subfield and the Type 3 subfield carry information about an SF connected to each L-SFF in the Type 1 subfield.

The Type 5 subfield is an identifier of a T-SFF connected to the low level, and when the low level is connected to two or more T-SFFs, identifiers of the two or more T-SFFs may be carried in the Type 5 subfield.

The Type n field is a low-level forwarding table that may be of the strict path type, loose path type, or relative strict path type described above.

Table 3 shows a possible implementation of the L-level→T-level sub-TLV subfield.

TABLE 3

Type 1=domain id
Type 2=Service Type
Type 3=L-CF id
. . .

A sequence of subfields from Type 1 to Type n is not limited. The Type 1 subfield is an identifier of an SFC domain corresponding to the low level, Type 2 is a service type of the SFC domain, and Type 3 is an identifier of an L-CF in the SFC domain.

Table 4 shows a possible implementation of the T-level→L-level sub-TLV subfield.

TABLE 4

Type 1=T-SFF id
. . .

Table 5 shows a possible implementation of a T-level→T-level sub-TLV subfield in an intra-AS-domain network.

TABLE 5

Type 1=T-SFF id
Type 2=domain id
Type 3=Service Type
. . .
Type n=top-level intra-AS forwarding table A sequence of subfields from Type 1 to Type n is not limited.

It should be noted that when the Type 1 subfield carries identifiers of a plurality of T-SFFs, correspondingly, the Type 2 subfield and the Type 3 subfield carry information about an SFC domain connected to each T-SFF in the Type 1 subfield.

The Type n field is a top-level forwarding table in an AS domain, and the top-level forwarding table may be of the strict path type, loose path type, or relative strict path type described above.

In addition, when the T-SFF is connected to an SF instead of the SFC domain, Type 2 and Type 3 are used to carry an identifier of the SF and a service type of the SF.

Table 6 shows a possible implementation of a T-level→T-level sub-TLV subfield in an inter-AS-domain network architecture. The T-level→T-level sub-TLV subfield is used to identify information advertised between network elements at a top level in a same AS domain.

TABLE 6

Type 1=T-SFF id
Type 2=domain id
Type 3=Service Type
Type 4=(T-CF id, AS id)
. . .
Type n − 1=top-level intra-AS forwarding table
Type n=top-level inter-AS forwarding table Different from the format shown in Table 5, in the format shown in Table 6, the Type 4 subfield is further used to carry information about another AS domain. The information includes an identifier of the other AS domain and an identifier of a T-CF in the AS domain such that a T-SFF in a current AS domain can send a packet to the other AS domain for further processing.

In addition, in the format shown in Table 6, the Type n subfield is further used to carry an inter-AS-domain forwarding table. The inter-AS-domain forwarding table may be expressed as (T-CF id (1), AS id (1))→(T-CF id (2), AS id (2)) . . . , and is used to instruct to forward a packet between different AS domains. The inter-AS-domain forwarding table in the foregoing example is of a strict path type. Actually, the inter-AS-domain forwarding table may also be of a loose path type or a relatively strict path type, and details are not described herein.

Table 7 shows a possible implementation of an inter AS→AS sub-TLV subfield in an inter-AS-domain network.

TABLE 7

Type 1=(T-CF id, AS id)
Type 2=Service Type
. . .

The Type 1 subfield includes an identifier of an AS domain and an identifier of a T-CF in the AS domain, and the Type 2 subfield is a service type of the AS domain. When the Type 1 subfield carries identifier information of a plurality of AS domains, the Type 2 subfield correspondingly carries service types of the plurality of AS domains.

The following describes in detail the technical solutions provided in this embodiment of this application with reference to the three specific cases of the SFC network described above.

1. Topology Information and/or Forwarding Table Synchronization in an Intra-SFC-Domain Network In the intra-SFC-domain network, an SFF is connected to an SF, and topology information of the SFF includes an identifier of the SFF and information about the SF connected to the SFF. The information about the SF includes an identifier of the SF and a type of the SF. Topology information of a CF includes an identifier of the CF.

When a routing network element in the intra-SFC-domain network establishes a BGP connection in the full-mesh manner, each routing network element sends, to another routing network element in an SFC domain, a BGP update message that carries topology information of the routing network element such that each routing network element obtains topology information of all routing network elements in the SFC domain.

When a routing network element in the intra-SFC-domain network establishes a BGP connection using the RR, the intra-SFC-domain network shown in FIG. 1 is used as an example. A CF establishes an IBGP connection to an SFF1, the SFF1 establishes an IBGP connection to an SFF2, and the SFF1 is configured as an RR. A topology information synchronization process is as follows. The CF sends, to the SFF1, a BGP update message including topology information of the CF, after receiving the BGP update message sent by the CF, the SFF1 forwards, to the SFF2, the BGP update message including the topology information of the CF, the SFF2 sends, to the SFF1, a BGP update message including topology information of the SFF2, after receiving the BGP update message sent by the SFF2, the SFF1 forwards, to the CF, the BGP update message including the topology information of the SFF2, and the SFF1 sends, to the CF and the SFF2, a BGP update message including topology information of the SFF1.

It should be noted that the SFF1 may send the topology information of the SFF1 and the topology information of the CF to the SFF2 using one BGP update message, and send the topology information of the SFF1 and the topology information of the SFF2 to the CF using one BGP update message.

Forwarding table synchronization is similar to topology information synchronization. Therefore, when the routing network element in the intra-SFC-domain network establishes a BGP connection in the full-mesh manner, a routing network element first obtaining a forwarding table sends the forwarding table to another routing network element using a BGP update message, to synchronize the forwarding table.

When the routing network element in the intra-SFC-domain network establishes a BGP connection using the RR, if a routing network element used as an RR first obtains a forwarding table, the RR routing network element synchronizes, using a BGP update message, the forwarding table to another routing network element to which the routing network element establishes a BGP connection, to synchronize the forwarding table. If a non-RR routing network element first obtains a forwarding table, the routing network element may send, using a BGP update message, the forwarding table to another routing network element to which the routing network element establishes a BGP connection.

After receiving the BGP update message that includes the forwarding table, a routing network element used as an RR sends the forwarding table to another routing network element using a BGP update message.

In practice, the SFC network may further include two or more RR routing network elements. A person of ordinary skill in the art can learn, based on the foregoing description, of a topology information and/or forwarding table synchronization manner used when there are two or more RR routing network elements. Details are not described herein.

2. Topology Information and/or Forwarding Table Synchronization in an Intra-AS-Domain Network In the intra-AS-domain network, a low level is equivalent to an intra-SFC-domain network, and a topology information synchronization manner at the low level is similar to a topology information synchronization manner of an intra-SFC-domain network. A difference is as follows. An L-CF at the low level establishes an IBGP connection to a T-SFF at a top level, and the L-CF may obtain an identifier of the T-SFF from a BGP update message sent by the T-SFF, and synchronize the identifier of the T-SFF to an L-SFF at the low level using a BGP update message sent to the L-SFF at the low level such that after receiving a packet processed by an SF, the L-SFF returns the packet to the T-SFF based on the identifier of the T-SFF.

The T-SFF at the top level is connected to an SFC domain. Topology information synchronization at the top level includes the following implementations.

Manner 1: After topology information in the SFC domain is successfully synchronized, an L-CF in the SFC domain abstracts the topology information in the SFC domain to generate a service digest of the SFC domain. The service digest of the SFC domain includes an identifier of the SFC domain and a service type of the SFC domain. The L-CF sends a BGP update message to the T-SFF. The BGP update message includes an identifier of the L-CF and the service digest of the SFC domain in which the L-CF is located. A set including the identifier of the L-CF in the SFC domain and the service digest of the SFC domain is referred to as information about the SFC domain.

In Manner 1, the T-SFF uses, as topology information of the T-SFF, a set including the identifier of the T-SFF and the information that is about the SFC domain and that is received from the L-CF in the SFC domain connected to the T-SFF, and adds the topology information of the T-SFF to a BGP update message sent to a T-CF or another T-SFF that is at the top level and to which the T-SFF establishes an IBGP connection such that the identifier of the T-SFF and the information about the SFC domain connected to the T-SFF are synchronized at the top level.

Manner 2: After topology information in the SFC domain is successfully synchronized, an L-CF in the SFC domain directly sends, to the T-SFF, topology information of all routing network elements in the SFC domain that include the L-CF. After receiving the topology information of all the routing network elements in the SFC domain, the T-SFF abstracts the topology information in the SFC domain, and generates a service digest of the SFC domain.

Then, the T-SFF uses, as topology information of the T-SFF, a set including the identifier of the T-SFF, an identifier of the L-CF in the SFC domain, and the generated service digest of the SFC domain, and adds the topology information of the T-SFF to a BGP update message sent to a T-CF or another T-SFF that is at the top level and to which the T-SFF establishes an IBGP connection such that the identifier of the T-SFF and the information about the SFC domain connected to the T-SFF are synchronized at the top level.

Manner 3: After topology information in the SFC domain is successfully synchronized, an L-CF in the SFC domain directly sends, to the T-SFF, topology information of all routing network elements in the SFC domain that include the L-CF. The T-SFF uses, as topology information of the T-SFF, a set including the identifier of the T-SFF, an identifier of the L-CF in the SFC domain, an identifier of an L-SFF in the SFC domain, and information about an SF connected to the L-SFF, and adds the topology information of the T-SFF to a BGP update message sent to a T-CF or another T-SFF that is at the top level and to which the T-SFF establishes an IBGP connection such that the identifier of the T-SFF and the information about the SFC domain connected to the T-SFF are synchronized at the top level.

It should be noted that in the intra-AS-domain network, a quantity of T-SFFs connected to one SFC domain is not limited to one. When the SFC domain is connected to two or more T-SFFs, an L-CF in the SFC domain needs to synchronize, in the SFC domain, an identifier of each T-SFF connected to the SFC domain such that an L-SFF in the SFC domain can return a packet to the T-SFFs connected to the SFC domain. Likewise, the L-CF in the SFC domain needs to send topology information in the SFC domain to each T-SFF connected to the SFC domain such that each T-SFF connected to the SFC domain can use the topology information in the SFC domain (for example, a service digest of the SFC domain and an identifier of the L-CF) as topology information of the T-SFF, and notify another network element at a top level that the T-SFF can route a packet to the SFC domain.

In addition, the T-SFF may further be connected to an SF in addition to the SFC domain. For this case, refer to a case of the intra-SFC-domain network, and details are not described herein.

In an AS domain, the forwarding table may be synchronized only at a current level. For a forwarding table synchronization manner at each level, refer to the forwarding table synchronization manner in the intra-SFC-domain network.

3. Topology Information and/or Forwarding Table Synchronization in an Inter-AS-Domain Network In the inter-AS-domain network, a T-CF in each AS domain further establishes an EBGP connection to a T-CF in at least one another AS domain. A topology information synchronization manner in each AS domain is similar to the method described above. A difference is as follows. A T-CF in a first AS domain obtains an identifier of a T-CF in a second AS domain using a BGP update message sent by the T-CF in the second AS domain, and synchronizes, using a BGP update message sent to a T-SFF in the first AS domain, the identifier of the T-CF in the second AS domain to the T-SFF in the first AS domain such that after receiving a packet processed by an SF or an SFC domain, the T-SFF in the first AS domain sends, based on the identifier of the T-CF in the second AS domain, the packet to the second AS domain for further processing.

In addition, after topology information in an AS domain is successfully synchronized, a T-CF in the AS domain abstracts the topology information in the AS domain to generate a service digest of the AS domain. The service digest includes an identifier and a service type of the AS domain. Then, the T-CF in the AS domain sends the service digest of the AS domain to a T-CF that is in another AS domain and to which the T-CF establishes an EBGP connection. A set including the service digest of the AS domain and an identifier of the T-CF in the AS domain is used as topology information in the AS domain. T-CFs in different AS domains send a BGP update message to each other such that topology information of each AS domain is synchronized in the SFC network.

For synchronization of an inter-AS-domain forwarding table, the T-CF needs to send the inter-domain forwarding table to the T-CF in the other AS domain using a BGP update message, and further needs to send the inter-domain forwarding table to an SFF at a top level in the AS domain such that the SFF can route a packet to the other AS domain based on the inter-domain forwarding table.

In the foregoing topology information synchronization methods, topology information can be synchronized in the SFC network, without manually entering the topology information by a user such that efficiency is relatively high. In addition, the foregoing topology information synchronization method can be used in running of the SFC network, to make it possible to dynamically adjust the topology information in the SFC network and define a faulty network element based on the topology information in the SFC network.

An embodiment of this application further provides a method for synchronizing a forwarding table in an SFC network. The SFC network includes at least two routing network elements, and the at least two routing network elements include at least one CF and at least one SFF. The method includes the following steps.

A first network element in the at least two routing network elements establishes a BGP connection to at least one second network element other than the first network element in the at least two routing network elements, where the first network element is any one of the at least two routing network elements, the first network element obtains a forwarding table, and the first network element sends a BGP update message to the at least one second network element, where the BGP update message includes the forwarding table such that the at least one second network element obtains the forwarding table.

For an implementation of the foregoing technical solution, refer to implementations of step 101, step 101, and step 112, and details are not described herein.

Figure 9:
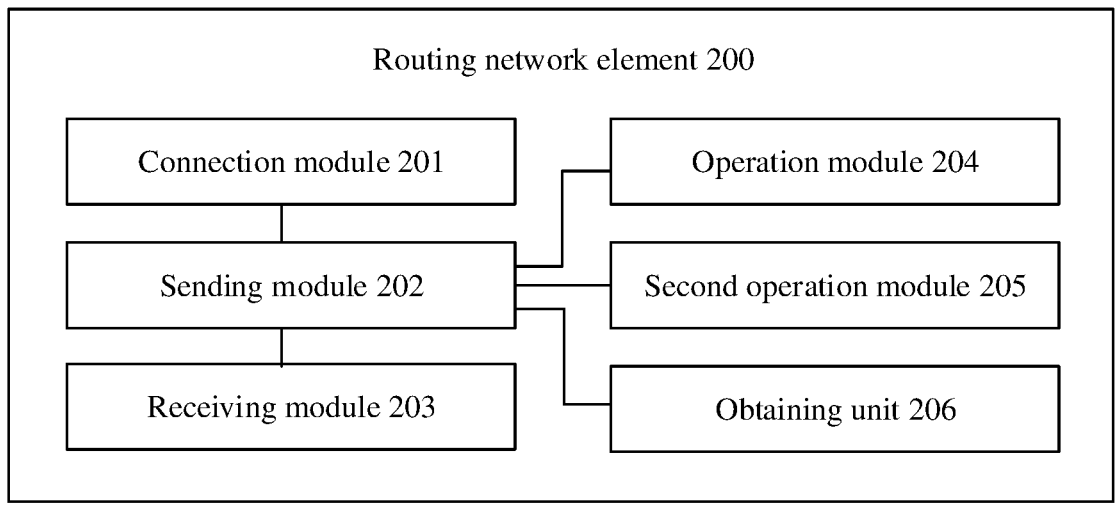
FIG. 9 is a schematic diagram of a routing network element according to an embodiment of this application.

An embodiment of this application further provides a routing network element 200. The routing network element 200 is applied to an SFC network, the SFC network includes at least two routing network elements, the at least two routing network elements include at least one CF and at least one SFF, and the routing network element 200 is any one of the at least two routing network elements. Referring to FIG. 9, the routing network element 200 includes a connection module 201 configured to establish a BGP connection to at least one second network element other than the routing network element 200 in the at least two routing network elements, and a sending module 202 configured to send a first BGP update message to the at least one second network element, where the first BGP update message includes topology information of the routing network element 200 such that the at least one second network element obtains the topology information of the routing network element 200.

Optionally, in this embodiment of this application, the routing network element 200 establishes a full-mesh BGP connection to the at least one second network element.

Optionally, in this embodiment of this application, the routing network element 200 is configured as an RR, and the routing network element 200 further includes a receiving module 203 configured to receive a second BGP update message sent by a network element A in the at least one second network element, where the second BGP update message includes topology information of the network element A.

The sending module 202 is further configured to send a third BGP update message to a network element B other than the network element A in the at least one second network element, where the third BGP update message includes the topology information of the network element A.

Optionally, in this embodiment of this application, when the routing network element 200 is an SFF, the topology information of the routing network element 200 includes an identifier of the routing network element 200, and information about an SF connected to the routing network element 200 or information about a subdomain connected to the routing network element 200. The information about the SF connected to the routing network element 200 includes an identifier of the SF and a service type of the SF, and the information about the subdomain connected to the routing network element 200 includes an identifier of the subdomain, a service type of the subdomain, and an identifier of a top-level CF in the subdomain.

Optionally, in this embodiment of this application, when the routing network element 200 is a top-level CF in a first subdomain and the routing network element 200 establishes a BGP connection to at least one upper-level SFF, the routing network element 200 further includes an operation module 204 configured to determine that topology information in the first subdomain is successfully synchronized, and after the topology information in the first subdomain is successfully synchronized, generate a service digest of the first subdomain based on the topology information of routing network elements in the first subdomain, where the service digest of the first subdomain includes an identifier of the first subdomain and a service type of the first subdomain.

The sending module 202 is further configured to send a fourth BGP update message to the at least one upper-level SFF, where the fourth BGP update message includes the service digest of the first subdomain such that the at least one upper-level SFF obtains the service digest of the first subdomain.

Optionally, in this embodiment of this application, the SFC network includes a first AS domain and a second AS domain, and when the routing network element 200 is a top-level CF in the first AS domain and the routing network element 200 establishes a BGP connection to a top-level CF in the second AS domain, the routing network element 200 further includes a second operation module 205 configured to determine that topology information in the first AS domain is successfully synchronized, and after determining that the topology information in the first AS domain is successfully synchronized, generate a service digest of the first AS domain based on the topology information of routing network elements in the first AS domain, where the service digest of the first AS domain includes an identifier of the first AS domain and a service type of the first AS domain.

The sending module 202 is further configured to send a fifth BGP update message to the top-level CF in the second AS domain, where the fifth BGP update message includes the service digest of the first AS domain such that the second AS domain obtains the service digest of the first AS domain.

Optionally, in this embodiment of this application, the routing network element 200 further includes an obtaining module 206 configured to obtain a forwarding table.

The sending module 202 is further configured to send a sixth BGP update message to the at least one second network element, where the sixth BGP update message includes the forwarding table such that the at least one second network element obtains the forwarding table.

Optionally, in this embodiment of this application, when the routing network element 200 is configured as an RR, the receiving module 203 is further configured to receive a seventh BGP update message that is sent by the network element A and that carries a forwarding table.

The sending module 202 is further configured to send, to the network element B, an eighth BGP update message that carries the forwarding table.

Optionally, in this embodiment of this application, the first BGP update message carries the topology information of the routing network element 200 using an MP_REACH_NLRI field.

For implementations of the modules of the routing network element 200, refer to implementations of step 101 to step 112, and details are not described herein.

Figure 10:
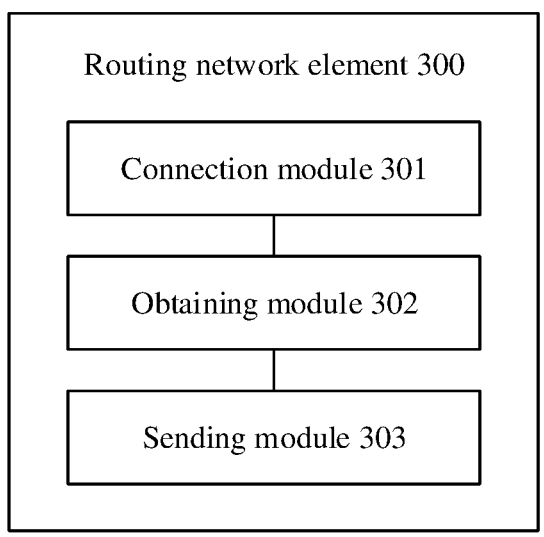
FIG. 10 is a schematic diagram of a routing network element according to an embodiment of this application.

An embodiment of this application further provides a routing network element 300. The routing network element 300 is applied to an SFC network, the SFC network includes at least two routing network elements, the at least two routing network elements include at least one CF and at least one SFF, and the routing network element 300 is any one of the at least two routing network elements. Referring to FIG. 10, the routing network element 300 includes a connection module 301 configured to establish a BGP connection to at least one second network element other than the routing network element 300 in the at least two routing network elements, an obtaining module 302 configured to obtain a forwarding table, and a sending module 303 configured to send a BGP update message to the at least one second network element, where the BGP update message includes the forwarding table such that the at least one second network element obtains the forwarding table.

For implementations of the modules of the routing network element 300, refer to implementations of step 101, step 101, and step 112, and details are not described herein.

Figure 11:
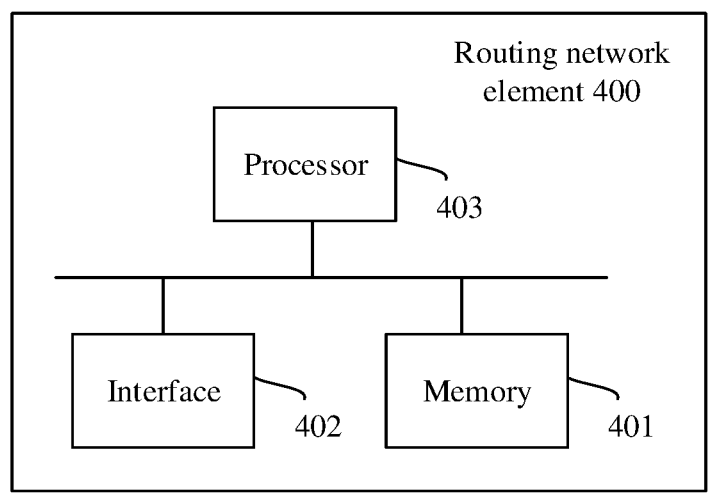
FIG. 11 is a schematic diagram of a routing network element according to an embodiment of this application.

An embodiment of this application further provides in FIG. 11, a routing network element 400. The routing network element 400 is applied to an SFC network, the SFC network includes at least two routing network elements, the at least two routing network elements include at least one CF and at least one SFF, and the routing network element 400 is any one of the at least two routing network elements. Referring to FIG. 11, the routing network element 400 includes a memory 401 configured to store a packet and topology information, an interface 402 configured to establish a BGP connection to at least one second network element other than the routing network element 400 in the at least two routing network elements, and a processor 403 configured to generate a first BGP update message, where the first BGP update message includes topology information of the routing network element 400.

The interface 402 is further configured to send a first BGP update message to the at least one second network element such that the at least one second network element obtains the topology information of the routing network element 400.

Optionally, in this embodiment of this application, the memory 401, the interface 402, and the processor 403 are connected to each other using a bus.

Optionally, in this embodiment of this application, the interface 402 establishes a full-mesh BGP connection to the at least one second network element.

Optionally, in this embodiment of this application, the routing network element 400 is configured as an RR, and the interface 402 is further configured to receive a second BGP update message sent by a network element A in the at least one second network element, where the second BGP update message includes topology information of the network element A.

The processor 403 is further configured to obtain the topology information of the network element A from the second BGP update message, and generate a third BGP update message that includes the topology information of the network element A.

The interface 402 is further configured to send the third BGP update message to a network element B other than the network element A in the at least one second network element.

Optionally, in this embodiment of this application, when the routing network element 400 is an SFF, the topology information of the routing network element 400 includes an identifier of the SFF and information about an SF or a subdomain that is connected to the routing network element 400. The information about the SF connected to the routing network element 400 includes an identifier of the SF and a service type of the SF, and the information about the subdomain connected to the routing network element 400 includes an identifier of the subdomain, a service type of the subdomain, and an identifier of a top-level CF in the subdomain.

Optionally, in this embodiment of this application, when the routing network element 400 is a top-level CF in a first subdomain and the routing network element 400 establishes a BGP connection to at least one upper-level SFF, the processor 403 is further configured to determine that topology information in the first subdomain is successfully synchronized, after the topology information in the first subdomain is successfully synchronized, generate a service digest of the first subdomain based on the topology information of routing network elements in the first subdomain, where the service digest of the first subdomain includes an identifier and a service type of the first subdomain, and generate a fourth BGP update message that includes the service digest of the first subdomain.

The interface 402 is further configured to send the fourth BGP update message to the at least one upper-level SFF such that the at least one upper-level SFF obtains the service digest of the first subdomain.

Optionally, in this embodiment of this application, the SFC network includes a first AS domain and a second AS domain, and when the routing network element 400 is a top-level CF in the first AS domain and the routing network element 400 establishes a BGP connection to a top-level CF in the second AS domain, the processor 403 is further configured to determine that topology information in the first AS domain is successfully synchronized, after determining that topology information in the first AS domain is successfully synchronized, generate a service digest of the first AS domain based on the topology information of routing network elements in the first AS domain, where the service digest of the first AS domain includes an identifier and a service type of the first AS domain, and generate a fifth BGP update message that includes the service digest of the first AS domain.

The interface 402 is further configured to send the fifth BGP update message to the top-level CF in the second AS domain such that the second AS domain obtains the service digest of the first AS domain.

Optionally, in this embodiment of this application, the processor 403 is further configured to obtain a forwarding table, and generate a sixth BGP update message that includes the forwarding table.

The interface 402 is further configured to send the sixth BGP update message to the at least one second network element such that the at least one second network element obtains the forwarding table.

Optionally, in this embodiment of this application, the routing network element is configured as an RR.

The interface 402 is further configured to receive a seventh BGP update message that is sent by the network element A and that carries a forwarding table.

The processor 403 is further configured to obtain the forwarding table from the seventh BGP update message, and generate an eighth BGP update message that includes the forwarding table.

The interface 402 is further configured to send the eighth BGP update message to the network element B.

Optionally, in this embodiment of this application, the first BGP update message carries the topology information of the routing network element 400 using an MP_REACH_NLRI field.

It should be noted that the processor 403 may be one processing element or a general term for a plurality of processing elements. For example, the processor 403 may be a central processing unit (CPU), or may be an application-specific integrated circuit (ASIC), or may be configured as one or more integrated circuits for implementing this embodiment of the present disclosure, for example, one or more digital signal processors (DSPs) or one or more field programmable gate arrays (FPGAs).

The memory 401 may be one storage element or a general term for a plurality of storage elements, and is configured to store executable program code, or a parameter, data, and the like that are required for running of a routing network element. In addition, the memory 401 may include a random-access memory (RAM), or may include a non-volatile memory (NVM) such as a disk memory or a flash memory (Flash Disk).

The interface 402 is any type of interface that supports a BGP protocol.

For implementations of the component units of the routing network element 400, refer to implementations of step 101 to step 112, and details are not described herein.

An embodiment of this application further provides a routing network element. The routing network element is applied to an SFC network, the SFC network includes at least two routing network elements, the at least two routing network elements include at least one CF and at least one SFF, and the routing network element is any one of the at least two routing network elements. For a schematic diagram of the routing network element, still refer to FIG. 11, and the routing network element 400 includes a memory 401 configured to store a packet and a forwarding table, an interface 402 configured to establish a BGP connection to at least one second network element other than the routing network element 400 in the at least two routing network elements, and a processor 403 configured to obtain a forwarding table, and generate a BGP update message that includes the forwarding table.

The interface 402 is further configured to send the BGP update message to the at least one second network element such that the at least one second network element obtains the forwarding table.

It should be noted that the processor 403 in this embodiment may be one processing element or a general term for a plurality of processing elements. For example, the processor 403 may be a CPU, or may be an ASIC, or may be configured as one or more integrated circuits for implementing this embodiment of the present disclosure, for example, one or more DSPs or one or more FPGAs.

The memory 401 in this embodiment may be one storage element or a general term for a plurality of storage elements, and is configured to store executable program code, or a parameter, data, and the like that are required for running of a routing network element. In addition, the memory 401 may include a RAM, or may include an NVM such as a disk memory or a flash memory (Flash Disk).

The interface in this embodiment is any type of interface that supports a BGP protocol.

For implementations of the component units of the routing network element in this embodiment, refer to implementations of step 101, step 101, and step 112, and details are not described herein.

An embodiment of this application further provides an SFC system. The system includes at least two routing network elements, and the at least two routing network elements include at least one CF and at least one SFF. For implementation of each of the at least two routing network elements, refer to that of the routing network element 400.

An embodiment of this application further provides a computer readable medium configured to store a computer program, and the computer program includes an instruction used to perform any one of step 101 to step 112.

In this embodiment of this application, on the basis of the implementations provided above, the implementations may be further combined to provide more implementations.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc read-only memory (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method implemented by a first network element in a service function chain (SFC) network and serving as a first service function forwarder (SFF), the method comprising:
   establishing a first Border Gateway Protocol (BGP) connection to a second network element;
   sending a first BGP update message to the second network element, wherein the first BGP update message comprises network layer reachability information (NLRI), wherein the NLRI comprises a type field, service function (SF) information about an SF connected to the first network element, and an identifier of the first network element, wherein the type field indicates that the NLRI comprises the SF information, and wherein the SF information comprises an identifier of the SF and a service type of the SF;
   establishing a second BGP connection to an upper-level SFF;
   determining that topology information in a first subdomain is synchronized, wherein the first network element is a top-level classifier (CF) in the first subdomain;
   generating a service digest of the first subdomain based on topology information of routing network elements in the first subdomain, wherein the service digest comprises an identifier of the first subdomain and a service type of the first subdomain; and
   sending a fourth BGP update message to the upper-level SFF,
   wherein the fourth BGP update message comprises the service digest.

2. The method of claim 1, wherein the first network element is configured as a route reflector (RR), and wherein the method further comprises:
   receiving a second BGP update message from a network element A, wherein the second BGP update message comprises second topology information of the network element A; and
   sending a third BGP update message to a network element B, wherein the third BGP update message comprises the second topology information.

3. The method of claim 1, wherein the SFC network further comprises a first autonomous system (AS) domain and a second AS domain, wherein the first network element is a first top-level classifier (CF) in the first AS domain, and wherein the method further comprises:
   establishing a second BGP connection to a second top-level CF in the second AS domain;
   determining that topology information in the first AS domain is successfully synchronized;
   generating a service digest of the first AS domain based on topology information of routing network elements in the first AS domain, wherein the service digest comprises an identifier of the first AS domain and a service type of the first AS domain; and
   sending a fifth BGP update message to the second top-level CF, wherein the fifth BGP update message comprises the service digest.

4. The method of claim 1, wherein the NLRI is SFC NLRI.

5. The method of claim 1, wherein the second network element is a second SFF.

6. The method of claim 1, wherein the second network element is a classifier (CF).

7. The method of claim 1, wherein the second network element is a controller.

8. The method of claim 1, wherein the SF provides an antivirus function, a firewall function, an application caching and acceleration function, or a web page optimization function.

9. A first network element in a service function chain (SFC) network, serving as a first service function forwarder (SFF), and comprising:
   a processor configured to:
      establish a first Border Gateway Protocol (BGP) connection to a second network element;
      establish a second BGP connection to an upper-level SFF;
      determine that topology information in a first subdomain is synchronized, wherein the first network element is a top-level classifier (CF) in the first subdomain; and
      generate a service digest of the first subdomain based on topology information of routing network elements in the first subdomain, wherein the service digest comprises an identifier of the first subdomain and a service type of the first subdomain; and
   a network interface coupled to the processor and configured to:
      send a first BGP update message to the second network element, wherein the first BGP update message comprises network layer reachability information (NLRI), wherein the NLRI comprises a type field, service function (SF) information about an SF connected to the first network element, and an identifier of the first network element, wherein the type field indicates that the NLRI comprises the SF information, and wherein the SF information comprises an identifier of the SF and a service type of the SF; and
      send a fourth BGP update message to the upper-level SFF,
      wherein the fourth BGP update message comprises the service digest.

10. The first network element of claim 9, wherein the first network element is configured as a route reflector (RR), and wherein the network interface is further configured to:
    receive a second BGP update message from a network element A, wherein the second BGP update message comprises second topology information of the network element A; and
    send a third BGP update message to a network element B, wherein the third BGP update message comprises the second topology information.

11. The first network element of claim 9, wherein the SFC network further comprises a first autonomous system (AS) domain and a second AS domain, wherein the first network element is a first top-level classifier (CF) in the first AS domain, and wherein the processor is further configured to:
    establish a second BGP connection to a second top-level CF in the second AS domain;
    determine that topology information in the first AS domain is successfully synchronized; and
    generate a service digest of the first AS domain based on topology information of routing network elements in the first AS domain after determining that the topology information in the first AS domain is successfully synchronized, wherein the service digest comprises an identifier of the first AS domain and a service type of the first AS domain,
    wherein the network interface is further configured to send a fifth BGP update message to the second top-level CF, and wherein the fifth BGP update message comprises the service digest.

12. The first network element of claim 9, wherein the NLRI is SFC NLRI.

13. The first network element of claim 9, wherein the second network element is a second SFF.

14. The first network element of claim 9, wherein the second network element is a classifier (CF) or a controller.

15. The first network element of claim 9, wherein the SF provides an antivirus function, a firewall function, an application caching and acceleration function, or a web page optimization function.

16. A computer program product comprising instructions that are stored on a non-transitory computer-readable medium and that, when executed by a processor, cause a first network element serving as a first service function forwarder (SFF) to:
- establish a first Border Gateway Protocol (BGP) connection to a second network element;
- send a first BGP update message to the second network element, wherein the first BGP update message comprises network layer reachability information (NLRI), wherein the NLRI comprises a type field, service function (SF) information about an SF connected to the first network element, and an identifier of the first network element, wherein the type field indicates that the NLRI comprises the SF information, and wherein the SF information comprises an identifier of the SF and a service type of the SF;
- establish a second BGP connection to an upper-level SFF;
- determine that topology information in a first subdomain is synchronized, wherein the first network element is a top-level classifier (CF) in the first subdomain;
- generate a service digest of the first subdomain based on topology information of routing network elements in the first subdomain, wherein the service digest comprises an identifier of the first subdomain and a service type of the first subdomain; and
- send a fourth BGP update message to the upper-level SFF, wherein the fourth BGP update message comprises the service digest.

17. The computer program product of claim 16, wherein the first network element is configured as a route reflector (RR), and wherein the instructions, when executed by the processor, further cause the first network element to:
- receive a second BGP update message from a network element A, wherein the second BGP update message comprises second topology information of the network element A; and
- send a third BGP update message to a network element B, wherein the third BGP update message comprises the second topology information.

18. The computer program product of claim 16, wherein the NLRI further comprises an identifier of the first network element.

19. The computer program product of claim 16, wherein the SF provides an antivirus function, a firewall function, an application caching and acceleration function, or a web page optimization function.

20. The computer program product of claim 16, wherein the NLRI is SFC NLRI.

* * * * *